Figure 1:
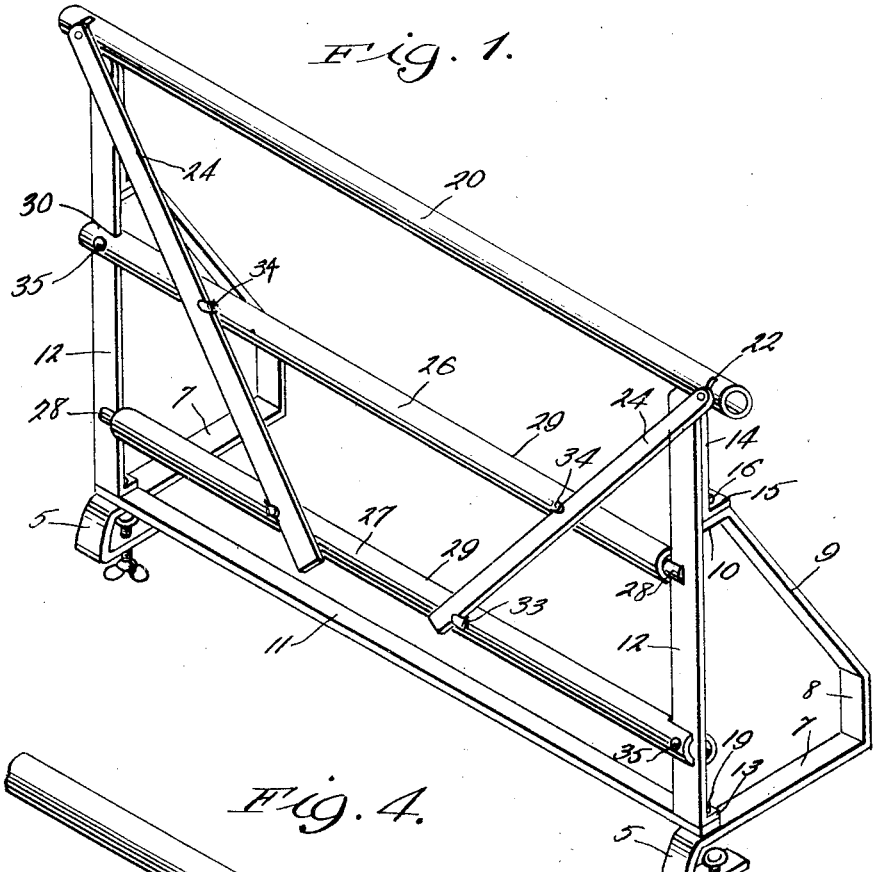

Nov. 13, 1928.

D. G. CONN 1,691,601

COMBINATION CAMP BED AND LUGGAGE CARRIER

Filed Sept. 8, 1924    3 Sheets-Sheet 1

Witnesses:

Inventor
D. G. CONN.
By Richard B. Owen.
Attorney

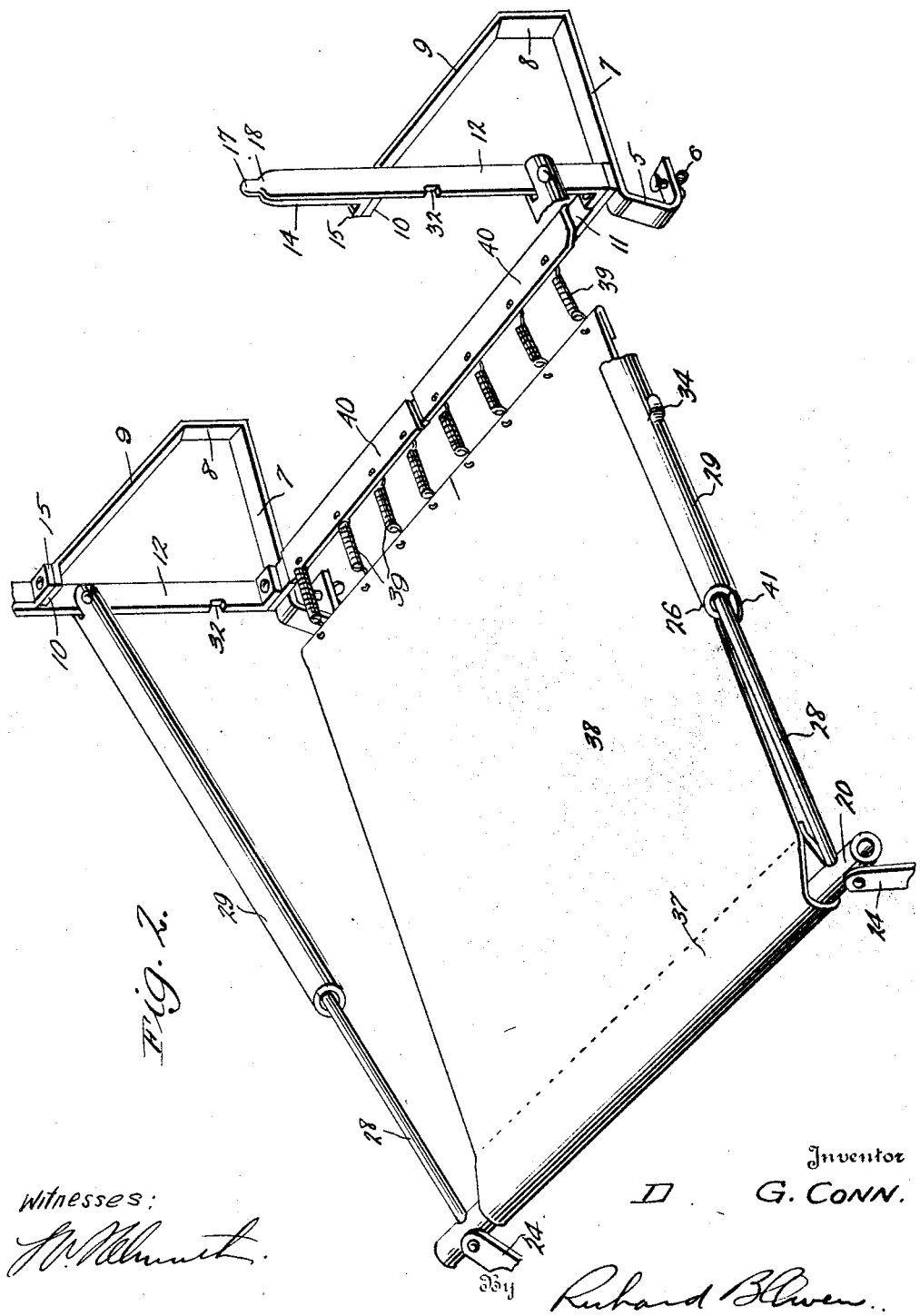

Nov. 13, 1928.  
D. G. CONN  
1,691,601  
COMBINATION CAMP BED AND LUGGAGE CARRIER  
Filed Sept. 8, 1924   3 Sheets-Sheet 3
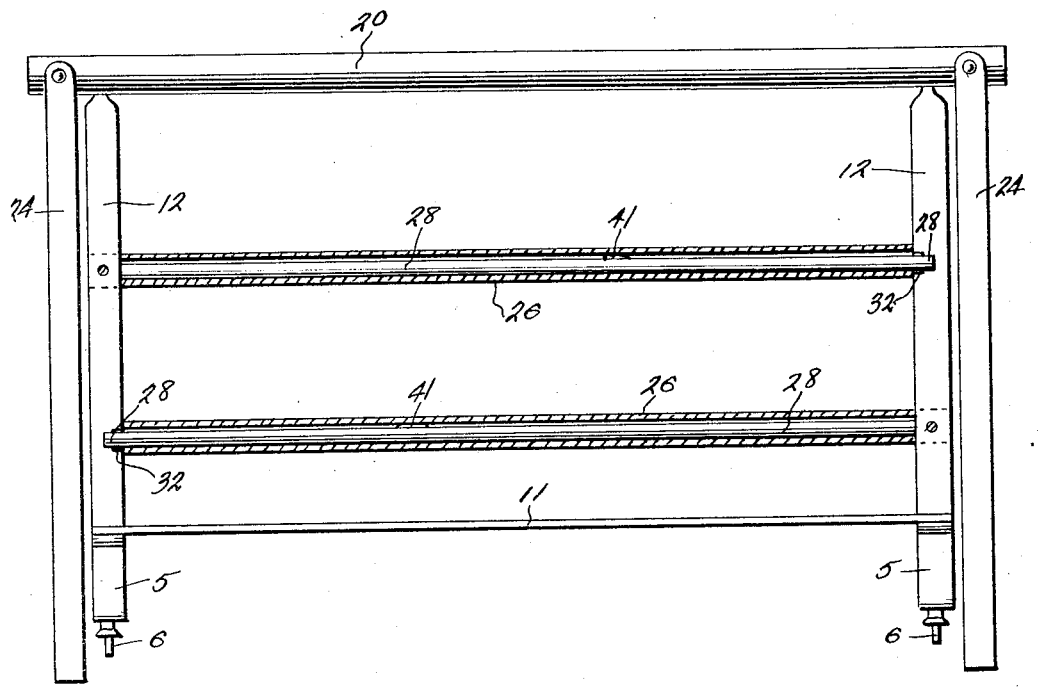

Patented Nov. 13, 1928.

1,691,601

UNITED STATES PATENT OFFICE.

DAVID G. CONN, OF YAKIMA, WASHINGTON.

COMBINATION CAMP BED AND LUGGAGE CARRIER.

Application filed September 8, 1924. Serial No. 736,663.

This invention relates to a combination camp bed and luggage carrier and has for its prime object to provide a device of this nature which may be conveniently attached to the running board of an automobile or the like in order that luggage may be conveniently stored and when desired the device may be utilized as a bed.

An important object of the invention is to provide a device of this nature which is of very simple and efficient construction, one which is reliable, easy to manipulate, strong, durable, and well adapted to the purpose for which it is designed.

With the above and numerous other objects in view as will appear as the description progresses, the invention resides in certain novel features of construction, and in the combination and arrangement of parts as will be hereinafter more fully described and claimed.

Figure 4:
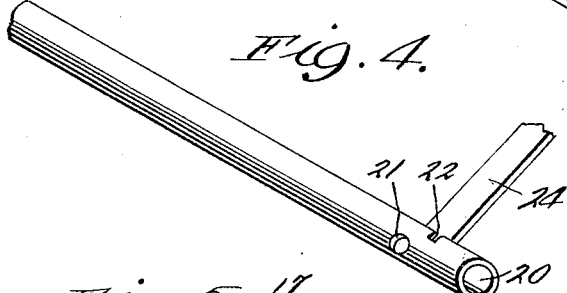
Figures 5, 7:
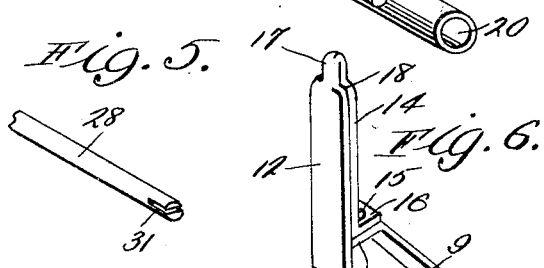
Figure 6:

In the drawing:

Figure 1 is a perspective view of the device showing the same arranged for use as a luggage carrier, Figure 2 is a perspective view thereof showing the device arranged for use as a camp bed, Figure 3 is a front elevation of the device partly in disassembled showing portions in section, Figure 4 is a fragmentary detail perspective view of the upper bar, Figure 5 is a detail perspective view of one end of one of the inner members of one of the telescopic bars, Figure 6 is a detail perspective view showing the upper end of one of the rotatable standards, Figure 7 is a transverse sectional view through the upper bar, and Figure 8 is a fragmentary elevation of one of the inner members of one of the telescopic bars, an intermediate portion being shown in section.

Referring to the drawing in detail it will be seen that the device is illustrated in Figure 1 in its folded condition so that it may be used as a luggage carrier. Clamps 5 are constructed to engage the edge of a running board and to be held in place by screws 6 or in any other suitable manner. These clamps are extended as at 7 so as to rest on the upper surface of the running board and are then bent upwardly as at 8 and then inclined to provide bracing arms 9 which terminate in ears 10. A cross rod 11 connects the two clamps 5 and holds them in spaced relation to each other. Two standards 12 are provided at their lower ends with ears 13 while their upper ends are folded over upon themselves as at 14 and terminate in ears 15 which are rotatably connected with the ears 10 by means of bolts 16. The upper ends of these standards are reduced so as to provide the lugs 17 having shoulders 18 one on each side thereof. The ears 13 at the bottom of the standards 12 are rotatably disposed on the ends of the rod 11 and connected thereto by means of bolts 19 and thus the standards 12 may be rotated either to the position shown in Figure 1 or to the position at right angles thereto as is shown in Figure 2. A top or end bar 20 is formed with openings 21 and slots 22. The openings 21 are adapted to receive the lugs 17 while the slots 22 are adapted to receive bolts or rivets 23 which are attached to legs 24. These legs 24 may thus be swingingly adjusted with respect to the bar 20 and the bolts 23 may be moved in the slots 22. Two bars 26 and 27 are disposed between the bar 20 and the rod 11 when the device is arranged as shown in Figure 1. Each of these bars 26 and 27 includes a telescopic assemblage comprising an inner member 28 and an outer member 29. One end of each of the outer members 29 is notched as at 30 and the opposite end of the inner member is notched as at 31. These notches 30 and 31 are adapted to engage the standards 12 so as to straddle the same, and the ends of the members, in which the notches are formed are adapted to engage in notches 32 provided in the standards. The bar 27 is provided with hooked lugs 33 which extend inwardly toward each other and the bar 26 is provided with similar lugs 34 which are extended away from each other and which are spaced farther apart than are the lugs 33. These lugs 33 and 34 are adapted to engage the pivoted legs 24 which are connected with the top bar 20 by means of bolts 23. The legs are sprung into engagement with the lugs thus locking the parts securely together. The device when thus arranged may be effectively utilized as a luggage carrier.

In order to convert the same into a camp bed the bars 26 and 27 are disengaged from standards 12. This may be done by springing bars 26 and 27 and legs 24 enough to disengage the standards as the latter are rotated. The various parts are made of resilient metal or the like and thus the bars 26 and 27 may be easily sprung sufficiently to disengage the notched ends thereof from the notches 32 in the standards 12. The top bar 20 is lifted from engagement with the standards. This top bar becomes the foot end or rail of the bed frame and is passed through the hem 37 of a strip sheet of canvas 38 or some other suitable material. A plurality of springs 39 are connected to the other end of this sheet 38 and are engaged with a bar 40 which is provided with an overturned flange along one edge to engage over the bar 11. It is preferable to make the bar 40 in two parts in order that the sheet 38, comprising the bed bottom, may be folded compactly when not in use.

The legs 24 support the bar 20 by resting on the ground, being preferably disposed so as to diverge from each other and so that their lower or free ends extend slightly away from the automobile upon which the device is mounted. The standards 12 are then rotated to the position shown in Figure 2 and the inner members 28 of the bars 26 and 27 are slidably adjusted to extend outwardly from the outer members 29 and are engaged at their notched ends in the the openings 21 of the bar 20. These inner members 28 will be held in their extended positions by spring pressed latches 41 provided in the inner members for engaging the ends of the outer members 29. The springs 39, it will be noted, tend to draw the bar 20 toward the rod 11 and therefore hold the latches 41 in abutment with the ends of the outer members 29 of bars 26 and 27.

From the above description taken in connection with the accompanying drawings it is thought that the construction and operation of the invention should be clearly understood. It is desired to point out that this device is capable of easy adjustment either to the folded position shown in Figure 1 or in the extended position shown in Figure 2, and thus when the bed is not in use it may be so arranged so as to form an efficient luggage carrier. It is evident that such a device is particularly desirable for tourists and if desired the canvas sheet 38 could be used as a cover over the luggage carrier for protecting baggage supported on the running board within the confines of the structure.

When the device is arranged for use as a carrier it is to be noted that the legs 24 act as efficient bracing devices, being sprung into engagement with the lugs 33 and 34, thus holding the various parts such as the bars 20, 26 and 27 rigid with respect to the standards 12 and causing the various parts to become a unit of considerable strength and efficiency.

While the preferred embodiment of my invention has been described in detail, it will be undestood that I do not wish to be limited to the particular construction set forth, since various changes in the form, material, proportions and arrangement of parts, and in the details of construction may be resorted to without departing from the spirit and scope of the invention as hereinafter claimed or destroying any of its advantages.

Having thus described my invention, what I claim as new is:

1. A convertible luggage carrier and bed including in combination, a pair of clamps, a pair of standards supported on the clamps, a bar provided with openings adapted to receive the ends of the standards, legs pivotally mounted on the bar, a second and third bar of telescopic construction each including an inner member and an outer member, said bars embodying means whereby they may be supported on the standards below the first bar, the outer members of said bars being provided with hooked lugs for holding the legs in folded position against the bar, means connecting one end of the telescopic bars to the standards, the other ends being adapted to be received within the openings of the first mentioned bar when disengaged from the standards.

2. A convertible luggage carrier and bed including in combination, a pair of clamps, a pair of standards supported on the clamps, a bar provided with openings adapted to receive the ends of the standards, legs pivotally mounted on the bar, a second and third bar of telescopic construction each including an inner member and an outer member, said bars embodying means whereby they may be supported on the standards below the first bar, the outer members of said bars being provided with hooked lugs for holding the legs in folded position against the bars, means connecting one end of the telescopic bars to the standards, the other ends being adapted to be received within the openings of the first mentioned bar when disengaged from the standards, said second and third bars including means whereby the inner members may be held extended in relation to the outer members.

3. A convertible luggage carrier and bed including in combination a pair of clamps, a pair of standards, means rotatably mounting the standards on the clamps, a bar, legs pivoted to the bar, a pair of telescopically constructed bars each having one end of each section thereof bifurcated, one end of one section of each bar being pivotally connected with the respective standard and the other end adapted to engage the opposite standard, said first mentioned bar being provided with apertures for receiving the upper ends of the standards and adapted to receive the outer ends of the telescopic bars when the bars are swung outwardly on the standard.

4. A convertible luggage carrier and bed including in combination a pair of clamps, a pair of standards, means rotatably mounting the standards on the clamps, a bar, legs pivoted to the bar, a pair of telescopically constructed bars each having one end of each section thereof bifurcated, one end of one section of each bar being pivotally connected with the respective standard and the other end being adapted to engage the opposite standard, said first mentioned bar being provided with apertures for receiving the ends of the upper standards and adapted to receive the outer ends of the telescopic bars when the bars are swung outwardly on the standards, said telescopically constructed bars being provided with hooked lugs so arranged that when said telescopically constructed bars are engaged at both ends with the standards and the first mentioned bar supported with the ends of the standards engaging in its opening the pivoted legs may be engaged between the hooked lugs and retained in place against said telescopic bars.

In testimony whereof I affix my signature.

DAVID G. CONN.